(12) United States Patent
Hall et al.

(10) Patent No.: US 9,311,098 B2
(45) Date of Patent: Apr. 12, 2016

(54) MECHANISM FOR REDUCING CACHE POWER CONSUMPTION USING CACHE WAY PREDICTION

(71) Applicant: Apple Inc., Cupertino, CA (US)

(72) Inventors: Ronald P. Hall, Austin, TX (US); Conrado Blasco-Allue, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 13/888,551

(22) Filed: May 7, 2013

(65) Prior Publication Data

US 2014/0337605 A1 Nov. 13, 2014

(51) Int. Cl.
*G06F 12/00* (2006.01)
*G06F 9/38* (2006.01)
*G06F 12/08* (2006.01)

(52) U.S. Cl.
CPC ............ *G06F 9/3806* (2013.01); *G06F 9/3838* (2013.01); *G06F 12/0864* (2013.01); *G06F 2212/1028* (2013.01); *G06F 2212/6082* (2013.01)

(58) Field of Classification Search
CPC .......... G06F 2212/1028; G06F 9/3844; G06F 9/3806; G06F 2212/6032; G06F 2212/6082; Y02B 60/1225
USPC ................................... 711/125, 204; 712/239
See application file for complete search history.

(56) References Cited

U.S. PATENT DOCUMENTS

| | | | |
|---|---|---|---|
| 6,073,230 A * | 6/2000 | Pickett et al. ................. | 712/205 |
| 6,647,490 B2 | 11/2003 | Keller et al. | |
| 7,130,991 B1 * | 10/2006 | Butler ........................... | 712/241 |
| 7,406,569 B2 * | 7/2008 | van de Waerdt .............. | 711/137 |
| 7,430,642 B2 | 9/2008 | Moyer | |
| 7,702,888 B2 * | 4/2010 | Evers et al. ................... | 712/237 |
| 8,225,046 B2 | 7/2012 | Licht et al. | |
| 8,392,651 B2 | 3/2013 | Mylavarapu | |
| 2006/0095680 A1 * | 5/2006 | Park et al. ..................... | 711/137 |
| 2006/0095746 A1 * | 5/2006 | Uchiyama et al. ............ | 712/239 |
| 2012/0084497 A1 * | 4/2012 | Subramaniam ....... | G06F 9/3816 711/105 |
| 2012/0290780 A1 | 11/2012 | Kinter et al. | |

(Continued)

OTHER PUBLICATIONS

Powell et al, Reducing Set-Associative Cache Energy via Way-Prediction and Selective Direct-Mapping, 2011 IEEE, pp. 54-65.*

*Primary Examiner* — Adam M Queler
*Assistant Examiner* — Edmund Kwong
(74) *Attorney, Agent, or Firm* — Meyertons, Hood, Kivlin, Kowert & Goetzel, P.C.; Erik A. Heter

(57) ABSTRACT

A mechanism for reducing power consumption of a cache memory of a processor includes a processor with a cache memory that stores instruction information for one or more instruction fetch groups fetched from a system memory. The cache memory may include a number of ways that are each independently controllable. The processor also includes a way prediction unit. The way prediction unit may enable, in a next execution cycle, a given way within which instruction information corresponding to a target of a next branch instruction is stored in response to a branch taken prediction for the next branch instruction. The way prediction unit may also, in response to the branch taken prediction for the next branch instruction, enable, one at a time, each corresponding way within which instruction information corresponding to respective sequential instruction fetch groups that follow the next branch instruction are stored.

20 Claims, 4 Drawing Sheets

(56) References Cited

U.S. PATENT DOCUMENTS

| | | | |
|---|---|---|---|
| 2012/0303938 A1* | 11/2012 | Chen et al. | 712/240 |
| 2013/0080750 A1* | 3/2013 | Ito et al. | 712/240 |
| 2013/0290676 A1* | 10/2013 | Aggarwal et al. | 712/205 |
| 2014/0181407 A1* | 6/2014 | Crum et al. | 711/128 |

* cited by examiner

MECHANISM FOR REDUCING CACHE POWER CONSUMPTION USING CACHE WAY PREDICTION

BACKGROUND

1. Technical Field

This disclosure relates to processor cache operation, and more particularly to reducing cache power consumption.

2. Description of the Related Art

Modern processors have become increasingly more capable of performing difficult tasks, and in shorter times. In most applications, processor performance is a driving force behind system design. However, along with the increased capability has come a concomitant increase in power consumption. In many systems, excess power consumption is problematic. For example in battery operated systems such as those found in mobile wireless and computing devices, excess power consumption directly contributes to shorter battery life. In the consumer electronics market, a short battery life can be a game changer for sales. In other contexts, excess processor power consumption may also be unacceptable. For example, server systems that employ numerous processors or processor cores per server, and many hundreds and thousands of servers such as may be found in a large data center may be sensitive to power consumption. More particularly, more power consumption means a bigger carbon footprint, more cooling requirements, more direct power costs, and the like. Accordingly, integrated circuit designers continually strive to find ways of reducing power consumption.

SUMMARY OF THE EMBODIMENTS

Various embodiments of a mechanism for reducing the power consumption of a cache memory of a processor using cache way prediction is disclosed. Broadly speaking, a processor includes a cache memory that stores instruction information for one or more instruction fetch groups fetched from a system memory. The cache memory may include a number of ways that are each independently controllable. For example, each way may be individually enable and disabled. The processor also includes a way prediction unit. The way prediction unit may be configured to enable, in a next execution cycle, a given way within which instruction information corresponding to a target of a next branch instruction is stored in response to a branch taken prediction for the next branch instruction. The way prediction unit may also be configured to, in response to the branch taken prediction for the next branch instruction, enable, one at a time, each corresponding way within which instruction information corresponding to respective sequential instruction fetch groups that follow the next branch instruction are stored.

Figure 1:
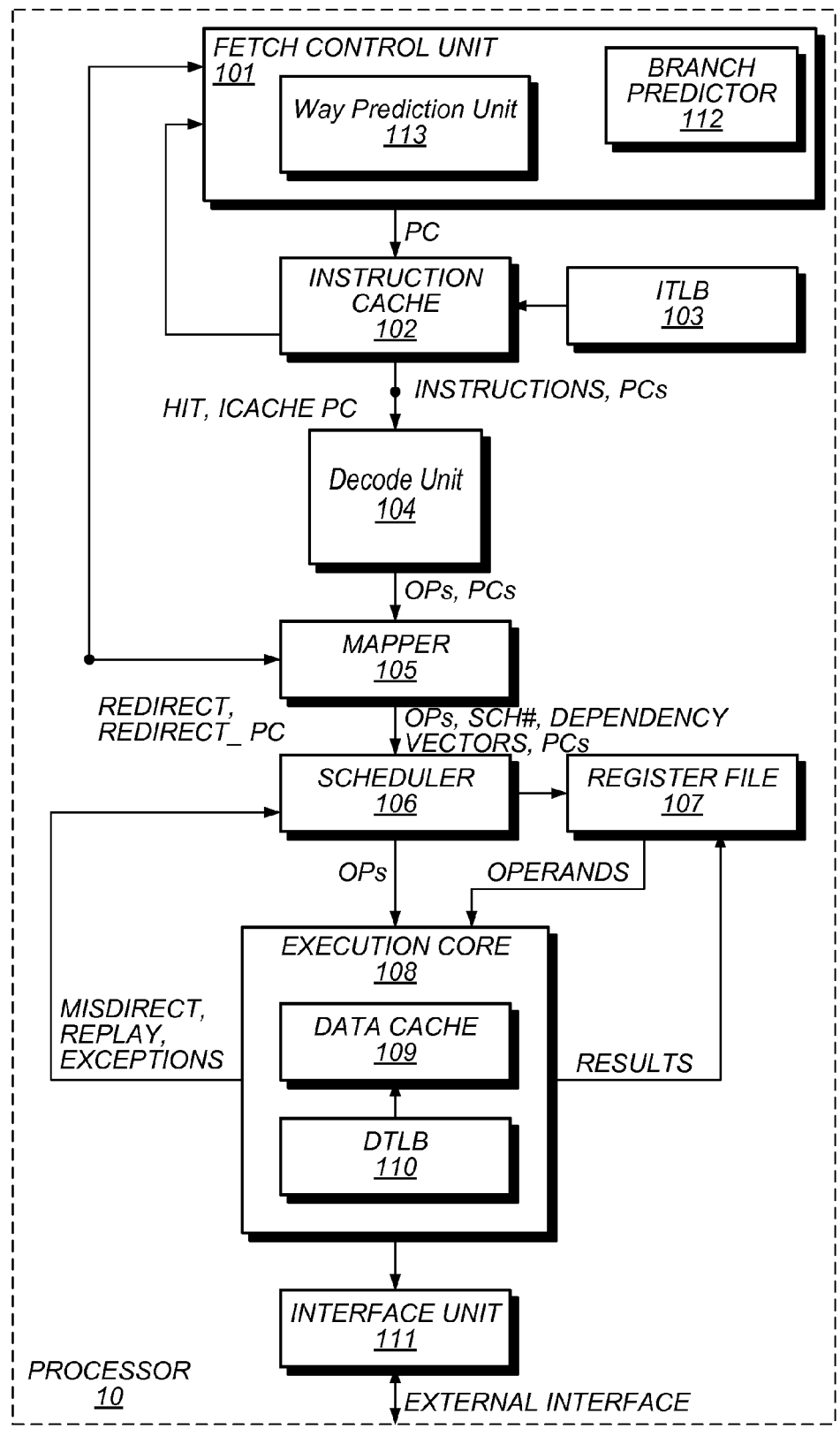
FIG. 1 is a block diagram of one embodiment of a processor.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a block diagram of one embodiment of a processor is shown. The processor 10 includes a fetch control unit 101, an instruction cache 102, a decode unit 104, a mapper 105, a scheduler 106, a register file 107, an execution core 108, and an interface unit 111. The fetch control unit 101 is coupled to provide a program counter address (PC) for fetching instructions to the instruction cache 102. The instruction cache 102 is coupled to provide instructions (with PCs) to the decode unit 104, which is coupled to provide decoded instruction operations (ops, again with PCs) to the mapper 105. The instruction cache 102 may also be configured to provide a hit indication and to generate instruction data as an output in response to a PC input. The mapper 105 is coupled to the scheduler 106 and to the fetch control unit 101. The scheduler 106 is coupled to the register file 107 and to the execution core 108. The register file is coupled to the execution core 108. The execution core 108 is coupled to the interface unit 111, which is further coupled to an external interface of the processor 200.

Fetch control unit 101 may be configured to generate fetch PCs for instruction cache 102. In some embodiments, fetch control unit 101 may include one or more types of branch predictors 112 and or way prediction unit 113. For example, fetch control unit 101 may include indirect branch target predictors configured to predict the target address for indirect branch instructions, conditional branch predictors configured to predict the outcome of conditional branches, and/or any other suitable type of branch predictor. More particularly, as described in more detail below, way prediction unit 113 may include a fast access next fetch prediction unit (201 of FIG. 2) and a sequential way prediction unit (203 of FIG. 2). During operation, fetch control unit 101 may generate a fetch PC based on the output of a selected branch predictor. If the prediction later turns out to be incorrect, fetch control unit 101 may be redirected to fetch from a different address, and the fetch pipeline may be flushed.

The instruction cache 102 may be a cache memory for storing instructions to be executed by the processor 10. In various embodiments, the instruction cache 102 may have any capacity and construction (e.g. direct mapped, set associative, fully associative, etc.). The instruction cache 102 may have any cache line size. For example, 64-byte cache lines may be implemented in one embodiment. Other embodiments may use larger or smaller cache line sizes. In response to a given PC from the fetch control unit 101, the instruction cache 102 may output up to a maximum number of instructions. It is contemplated that processor 10 may implement any suitable instruction set architecture (ISA), such as, e.g., the ARM™, PowerPC™, or x86 ISAs, or combinations thereof. In one particular implementation, the instruction cache 102 is a set associate cache that includes a number of independently configurable ways. For example, in one embodiment, the instruction cache 102 may be implemented as a 4-way set associative cache.

As described further below in conjunction with the descriptions of FIG. 2 and FIG. 3, each of the cache ways may be enabled and disabled independently to reduce power consumption. More particularly, when certain instruction sequences occur repetitively such as in a code loop that includes at least one branch instruction, it may be possible to accurately identify the cache way of the instruction cache 102 that stores the branch target instruction, as well as the respective cache ways that store the instructions for the sequential next fetch groups that follow a taken branch. If the branch and the corresponding cache ways are accurately predicted, the cache ways that are not being accessed may be disabled (or powered down), thereby saving power. Accordingly, in one embodiment disabling a particular cache way may refer to power gating or otherwise disconnecting a supply voltage from one or more circuits (such as sense amplifiers or output drivers, for example) within the array(s) of that particular way. In another embodiment, disabling a particular cache way may refer to gating or disabling any clocking of one or more circuits within the array of that particular way.

In some embodiments, processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 102 may use virtual address bits for cache indexing and physical address bits for cache tags.

To avoid the cost of performing a full memory translation when performing a cache access, processor 10 may store a set of recent and/or frequently-used virtual-to-physical address translations in a translation lookaside buffer (TLB), such as Instruction TLB (ITLB) 103. During operation, ITLB 103 (which may be implemented as a cache, as a content addressable memory (CAM), or using any other suitable circuit structure) may receive virtual address information and determine whether a valid translation is present. If so, ITLB 103 may provide the corresponding physical address bits to instruction cache 102. If not, ITLB 103 may cause the translation to be determined, for example by raising a virtual memory exception.

The decode unit 104 may generally be configured to decode the instructions into instruction operations (ops). As used herein, the terms micro-operations (micro-ops) and ops may be used interchangeably. Generally, an instruction operation may be an operation that the hardware included in the execution core 108 is capable of executing. Each instruction may translate to one or more instruction operations which, when executed, result in the operation(s) defined for that instruction being performed according to the instruction set architecture implemented by the processor 10. In some embodiments, each instruction may decode into a single instruction operation. The decode unit 104 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 104 and mapper 105 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Operations generated by the decode unit 104 may be provided to the mapper 105. The mapper 105 may provide the ops along with any dependency information to the scheduler 106. In one embodiment, the mapper 205 may implement register renaming to map source register addresses from the ops to the source operand numbers (SO#s) identifying the renamed source registers. Additionally, the mapper 105 may be configured to assign a scheduler entry to store each op, identified by the SCH#. In an embodiment, the SCH# may also be configured to identify the rename register assigned to the destination of the op. In other embodiments, the mapper 105 may be configured to assign a separate destination register number. Additionally, in one embodiment, the mapper 105 may be configured to generate dependency information for the ops.

The scheduler 106 may be configured to store the ops in the scheduler entries identified by the respective SCH#s, along with the SO#s and PCs. The scheduler may be configured to store the dependency information in dependency arrays that evaluate which ops are eligible for scheduling. The scheduler 106 may be configured to schedule the ops for execution in the execution core 108. When an op is scheduled, the scheduler 106 may be configured to read its source operands from the register file 107 and the source operands may be provided to the execution core 108. The execution core 108 may be configured to return the results of ops that update registers to the register file 107. In some cases, the execution core 108 may forward a result that is to be written to the register file 107 in place of the value read from the register file 107 (e.g. in the case of back to back scheduling of dependent ops).

The execution core 108 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 108 may be configured to execute predicted branch ops, and may receive the predicted target address that was originally provided to the fetch control unit 101. The execution core 108 may be configured to calculate the target address from the operands of the branch op, and to compare the calculated target address to the predicted target address to detect correct prediction or misprediction. The execution core 108 may also evaluate any other prediction made with respect to the branch op, such as a prediction of the branch op's direction. If a misprediction is detected, execution core 108 may signal that fetch control unit 101 should be redirected to the correct fetch target. As described further below, the way prediction unit 113 may be trained during the redirection process. Other units, such as the scheduler 106, the mapper 105, and the decode unit 104 may flush pending ops/instructions from the speculative instruction stream that are subsequent to or dependent upon the mispredicted branch.

As shown, the execution core 108 may include a data cache 109, which may be a cache memory for storing data to be processed by the processor 10. Like the instruction cache 102, the data cache 109 may have any suitable capacity, construction, or line size (e.g. direct mapped, set associative, fully associative, etc.). Moreover, the data cache 109 may differ from the instruction cache 102 in any of these details. As with instruction cache 102, in some embodiments, data cache 109 may be partially or entirely addressed using physical address bits. Correspondingly, a data TLB (DTLB) 110 may be provided to cache virtual-to-physical address translations for use in accessing the data cache 109 in a manner similar to that described above with respect to ITLB 103. It is noted that although ITLB 103 and DTLB 110 may perform similar functions, in various embodiments they may be implemented differently. For example, they may store different numbers of translations and/or different translation information.

The register file 107 may generally include any set of registers usable to store operands and results of ops executed in the processor 10. In some embodiments, the register file 107 may include a set of physical registers and the mapper 105 may be configured to map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 107 may include an architected register set containing the committed state of the logical registers and a speculative register set containing speculative register state.

The interface unit 111 may generally include the circuitry for interfacing the processor 10 to other devices such as a system memory (not shown in FIG. 1), for example, on the external interface. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

Figure 2:
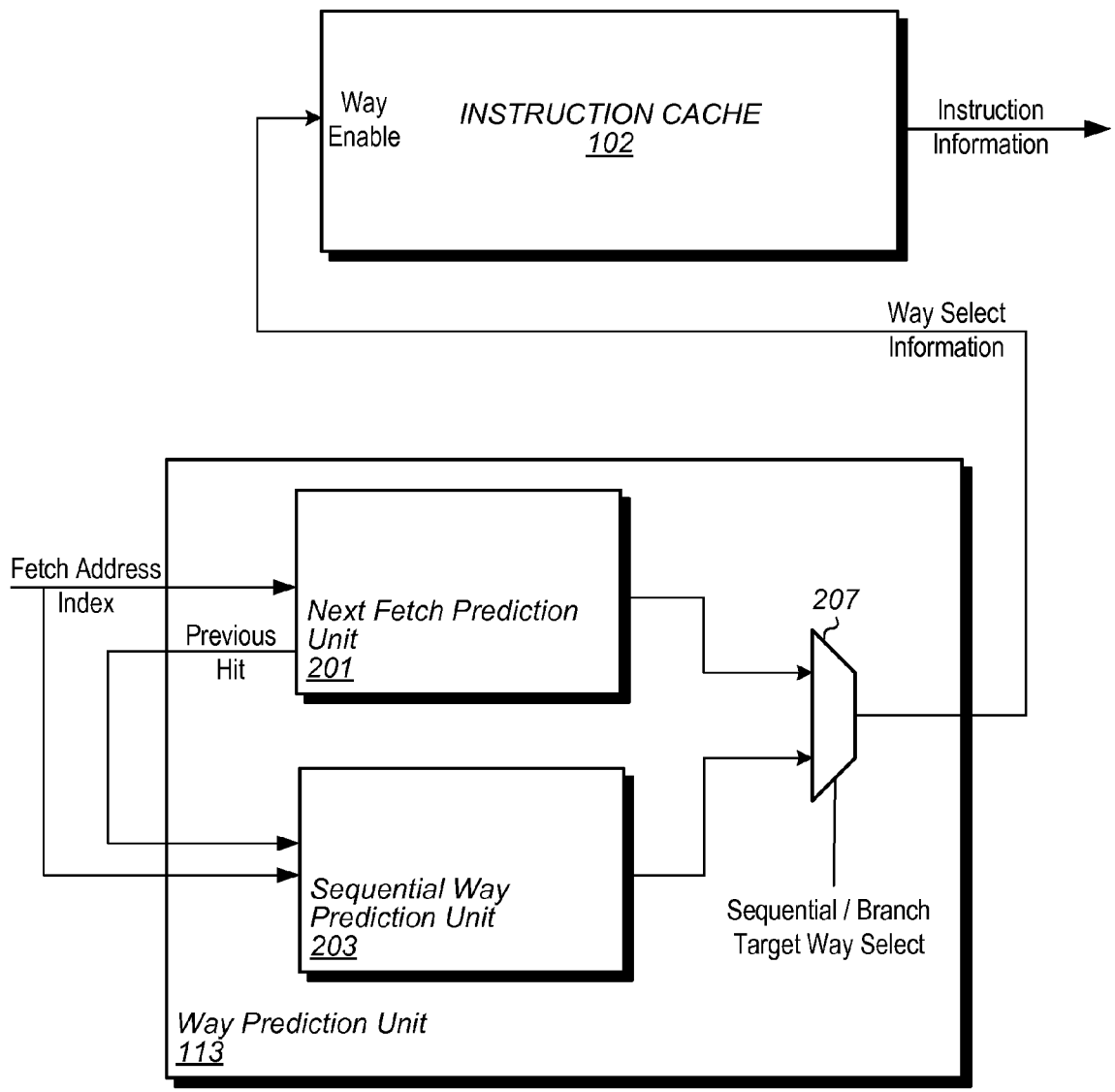
FIG. 2 is a block diagram of depicting more detailed aspects of one embodiment of the processor of FIG. 1.

Referring to FIG. 2, a block diagram illustrating more detailed aspects of the processor of FIG. 1 is shown. As mentioned above, and shown in FIG. 2, the processor 10 includes a way prediction unit 113, which includes a next fetch prediction unit 201 and a sequential way prediction unit 203, both of which are coupled through a multiplexer 207 to the instruction cache 102.

In one embodiment, the next fetch prediction unit 201 may be configured to perform simple branch direction and target prediction. The next fetch prediction unit 201 may include a number of indexed entries. Accordingly, the next fetch prediction unit 201 may store, in each entry, branch target information that is indexed and tagged by the fetch address. A hit/miss indication represents the taken/not taken prediction, and the output of a storage array (not shown) within the next fetch prediction unit 201 represents the predicted target for the case of a hit. In the case of a miss, the fetch control unit 101 may continue fetching on the sequential path. In one embodiment, the next fetch prediction unit 201 may be trained using the information that drives the redirection process during, for example, a branch mispredict. More particularly, information from branch prediction unit 112, and branch targets predicted and computed for direct, return, and indirect-not-return branches. Accordingly, the next fetch prediction unit 201 may be a fast access cache for the above predictors. In one embodiment, predictions by the next fetch prediction unit 201 may be verified by more accurate predictors such as the branch prediction unit 112.

The next fetch prediction unit 201 may also be configured to store, in each entry, way prediction information which indicates the cache way of the instruction cache 102 in which the branch target address is stored for the next cycle. Accordingly, a hit in the next fetch prediction unit 201 may produce as an output, a branch target and the way in which the target is stored in the instruction cache 102. As described further below, this way information may be used to enable that way, and to disable some or all other ways of the instruction cache 102 when accessing the instruction cache 102 for the target of the branch instruction.

In one embodiment, the sequential way prediction unit 203 may also include a storage array (not shown) having some number of entries. Each entry in the sequential way prediction unit 203 may store way prediction information which indicates the cache way of the instruction cache in which the instructions are stored for a particular sequential fetch group to be executed in the cycles following the taken branch instruction. As described further below, this way information may be used to enable the ways associated with the fetch groups following the taken branch, and to disable some or all other ways of the instruction cache 102 when accessing the instruction cache 102 for instructions of the respective sequential fetch groups in the next cycle cycles.

In one embodiment, the sequential way prediction unit 203 is accessed using the same fetch address index that was used to access the next fetch prediction unit 201 such that there is a one-to-one correspondence between each entry in the next fetch prediction unit 201 and a respective entry in the sequential way prediction unit 203. In addition, each entry in the sequential way prediction unit 203 may include a way prediction for each fetch group that lies in the shadow of the taken branch instruction. In other words, a given entry in the sequential way prediction unit 203 may include any number of way predictions, one for each sequential fetch group that is in the path of the taken branch. Accordingly, in such an embodiment, the sequential way prediction unit 203 may provide a fixed number of way predictions after a hit in the next fetch prediction unit 201 in a previous cycle. The fixed number corresponds to the number of fetch groups that follow the taken branch and each respective way prediction will be used in each consecutive cycle after the taken branch. For example, in various implementations, each entry of the sequential way prediction unit 203 may store four, eight, or sixteen way predictions.

In one embodiment, the sequential way prediction unit 203 is only accessed if in the previous cycle, there was a hit in the next fetch prediction unit 201. Accordingly, in response to a hit in the current cycle within the next fetch prediction unit 201 the way prediction unit 113 may be configured to generate a multiplexer selection signal that selects the output of the next fetch prediction unit 201 to enable the ways of the instruction cache 102. In addition, if there was a hit in the previous cycle, the way prediction unit 113 may be configured to generate a multiplexer selection signal that selects the output of the sequential way prediction unit 203 to enable the ways of the instruction cache 102.

Figure 3:
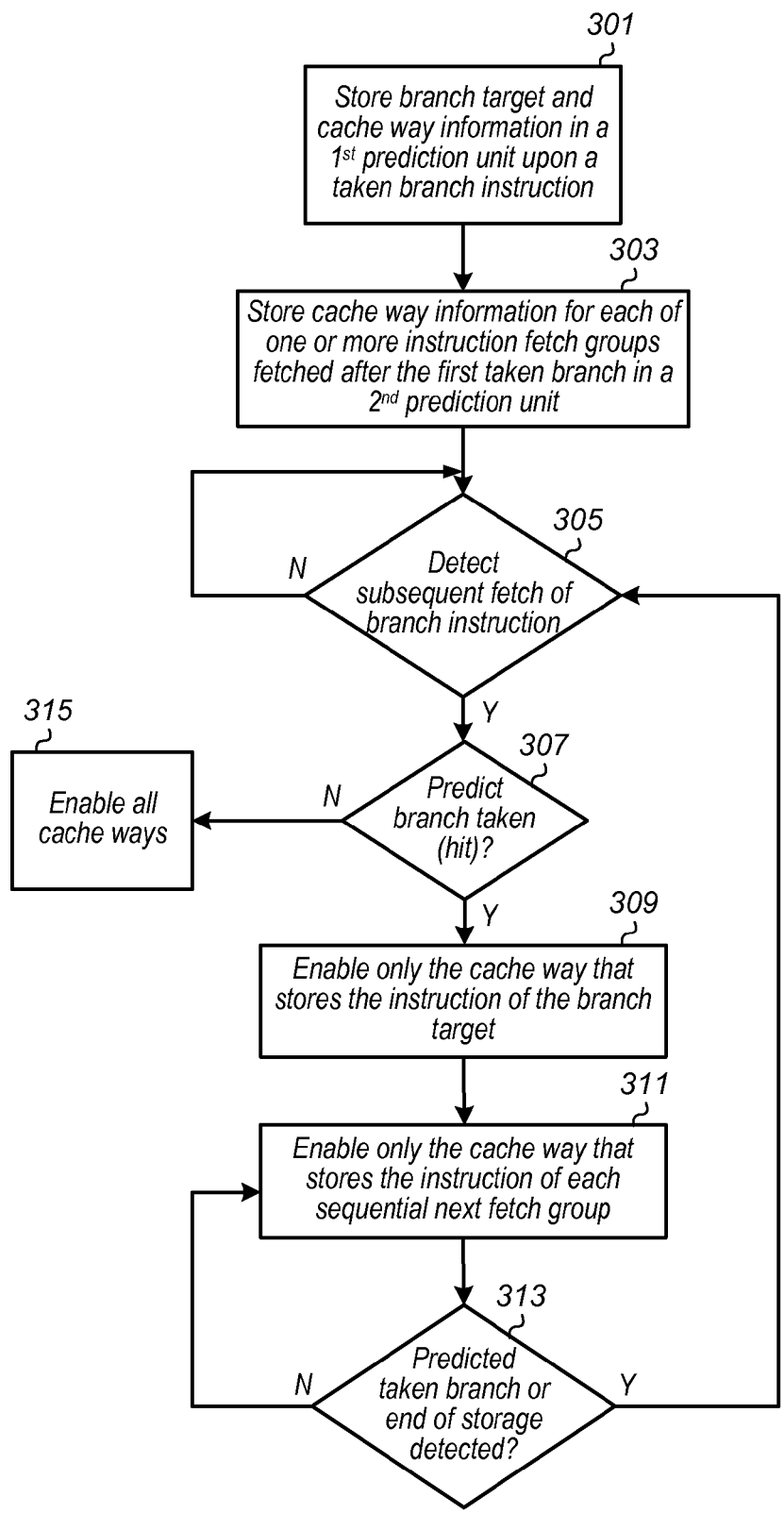
FIG. 3 is a flow diagram describing operational aspects of the processor and cache memory of FIG. 1 and FIG. 2.

In FIG. 3, a flow diagram depicting operational aspects of the embodiments of the processor of FIG. 1 and FIG. 2 is shown. Referring collectively to FIG. 1 through FIG. 3, and beginning in block 301 of FIG. 3, during an initialization of the fetch and execution pipelines the fetch unit 101 begins fetching instructions. As each branch instruction is encountered, both the branch prediction unit 112 and the next fetch prediction unit 201 will predict taken/not taken. However, the prediction performed by the prediction unit 112 is typically very accurate and generally takes more than one cycle. The prediction performed by the next fetch prediction unit 201 is done in one cycle, and as such it is considered a fast access predictor as mentioned above.

As a first branch instruction is encountered, because the next fetch prediction unit 201 is empty it will predict not taken. If the branch prediction unit 112 agrees, then the fetch unit will continue to fetch instructions sequentially. If however, the branch prediction unit 112 predicts taken, then there is a mispredict, and the pipeline may be flushed and the redirection process begins. During the redirect process, the instructions in each fetch group are refetched, and an entry is made in the next fetch prediction unit that includes the target address of the branch, along with the way information of the instruction cache 102 in which the branch target is stored. Upon the branch being taken, the way information corresponding to the instructions of the sequential fetch groups following the taken branch are stored within a corresponding entry the sequential way prediction unit 203. In one embodiment, the sequential fetch group way information will continue to be stored until either that entry of the sequential way prediction unit 203 fills, or another branch instruction is encountered (block 303).

Once the next fetch prediction unit 201 and the sequential way prediction unit 203 have been initialized, and the branch instruction is detected (block 305), an index is generated based upon the fetch address of the branch instruction. The index is used to access the next fetch prediction unit. If the index does not hit within the next fetch prediction unit 201 (block 307), it is considered a not taken prediction, and the fetch unit 101 continues to fetch instruction fetch groups sequentially and all ways of the instruction cache 102 are enabled (block 315). However, if the index hits within the next fetch prediction unit 201 (block 307), it is considered a taken prediction and the indexed entry provides the branch target information and the way information through multiplexer 207 to enable the way in the instruction cache 102 that stores the branch target (block 309) for the next execution cycle.

Once the branch target information and the way information is provided for the branch instruction, the way prediction unit 203 is accessed based upon the fetch addresses of the next sequential instruction fetch groups. The way information is provided through multiplexer 207 to enable the way in the instruction cache 102 that stores the instructions for the next sequential fetch group (block 311) for the next execution cycle. The way prediction unit 203 is accessed sequentially for each next instruction fetch group, and the appropriate way is enabled in the instruction cache 102. As mentioned above, the accessing and enabling of the specific way in the instruction cache 12 continues until either another predicted taken branch instruction is encountered or there is no more storage space (block 313). It is noted that in one embodiment, if the branch prediction unit 112 produces a branch prediction that causes a mismatch between it and the next fetch prediction unit 201, the execution pipeline may be flushed and a redirect is initiated.

Figure 4:
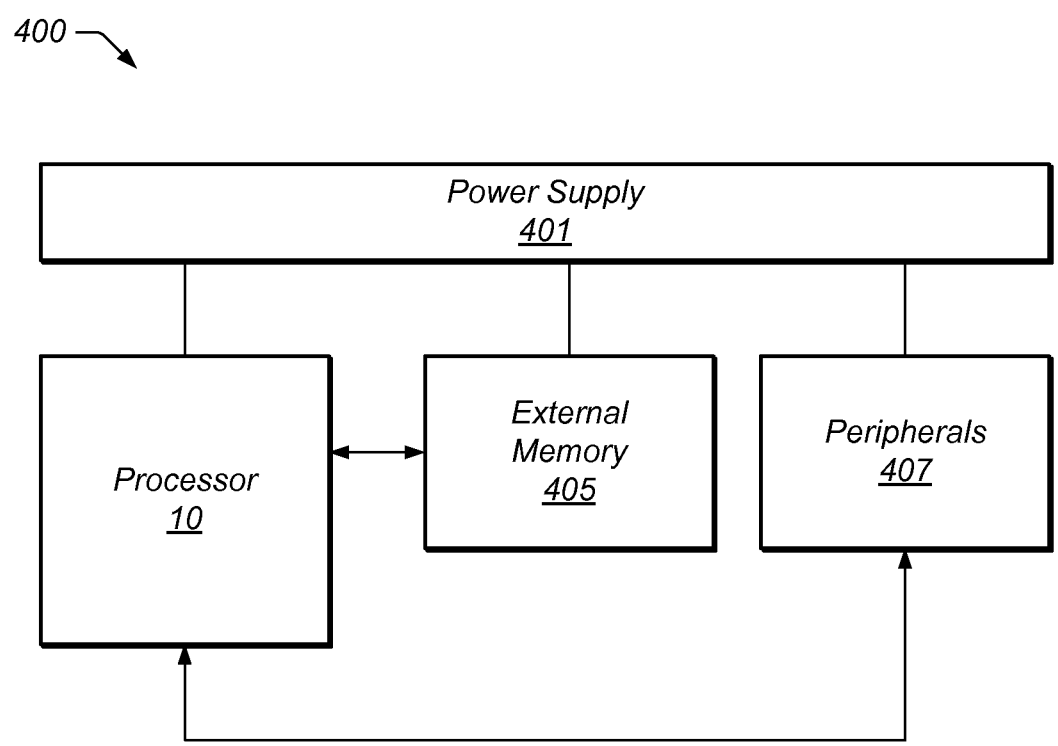
FIG. 4 is a block diagram of one embodiment of a system including the processor of FIG. 1 and FIG. 2.

Turning to FIG. 4, a block diagram of one embodiment of a system that includes the processor 10 of FIG. 1 is shown. The system 400 includes at least one instance of the processor 10 of FIG. 1 coupled to one or more peripherals 407 and an external system memory 405. The system 400 also includes a power supply 401 that may provide one or more supply voltages to the processor 10 as well as one or more supply voltages to the memory 405 and/or the peripherals 407. In some embodiments, more than one instance of the processor 10 may be included.

The peripherals 407 may include any desired circuitry, depending on the type of system. For example, in one embodiment, the system 400 may be included in a mobile device (e.g., personal digital assistant (PDA), smart phone, etc.) and the peripherals 407 may include devices for various types of wireless communication, such as WiFi, Bluetooth, cellular, global positioning system, etc. The peripherals 407 may also include additional storage, including RAM storage, solid-state storage, or disk storage. The peripherals 407 may include user interface devices such as a display screen, including touch display screens or multitouch display screens, keyboard or other input devices, microphones, speakers, etc. In other embodiments, the system 400 may be included in any type of computing system (e.g., desktop personal computer, laptop, tablet, workstation, net top, etc.).

The system memory 405 may include any type of memory. For example, the system memory 405 may be in the DRAM family such as synchronous DRAM (SDRAM), double data rate (DDR, DDR2, DDR3, etc.), or any low power version thereof. However, system memory 405 may also be implemented in SDRAM, static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A processor comprising:
   a cache memory for storing instruction information for one or more instruction fetch groups fetched from a system memory, wherein the cache memory includes a plurality of ways that are each independently controllable;

a way prediction unit coupled to the cache memory, the way prediction unit comprising a next fetch prediction unit, and a sequential way prediction unit, wherein:

the next fetch prediction unit is configured to, in response to a branch taken prediction for a next branch instruction, enable, in a next execution cycle, a given way within which instruction information corresponding to a target of the next branch instruction is stored;

wherein the sequential way prediction unit is configured to, in response to the branch taken prediction for the next branch instruction, enable, one at a time, each corresponding way within which instruction information corresponding to respective sequential instruction fetch groups that follow the next branch instruction are stored;

wherein the sequential way prediction unit is coupled to receive an indication of a previous hit from the next fetch prediction unit, wherein responsive to an indication of a previous hit in the next fetch prediction unit, the sequential way prediction unit is configured to provide a fixed number of way predictions; and wherein the next fetch prediction unit is configured to store, in each of a first plurality of entries, information describing a target of a branch instruction and information identifying a given cache way of a cache memory in which the target is stored and the sequential way prediction unit is configured to store, in each of a second plurality of entries corresponding to a unique one of the first plurality of entries, the given cache way of the cache memory in which each of the next instruction fetch groups is stored.

2. The processor of claim 1, wherein the way prediction unit is further configured to disable all remaining ways of the plurality of ways for the next execution cycle in response to the branch taken prediction for the next branch instruction.

3. The processor of claim 1, wherein the way prediction unit is further configured to disable all remaining ways of the plurality of ways for each next execution cycle following execution of the next branch instruction in response to the branch taken prediction for the next branch instruction.

4. The processor of claim 1, wherein the next fetch prediction unit is configured to store, in each of the first plurality of entries, information corresponding to a target address of a next branch instruction.

5. The processor of claim 4, wherein the sequential way prediction unit is configured to store, in each of the second plurality of entries, information identifying the one or more ways of the plurality of ways within which the instruction information corresponding to the respective sequential instruction fetch groups that follow the next branch instruction are stored.

6. The processor of claim 1, wherein, during an initialization sequence, the way prediction unit is configured to store the information corresponding to the target address of the next branch instruction and the information identifying the given way of the plurality of ways within which instruction information corresponding to the target of the next branch instruction in response to a detection of a branch mispredict upon a first occurrence of the next branch instruction.

7. The processor of claim 6, wherein, during an initialization sequence, the way prediction unit is further configured to store the information identifying the one or more ways of the plurality of ways within which the instruction information corresponding to the respective sequential instruction fetch groups that follow the next branch instruction in response to the way prediction unit storing the information corresponding to the target address of the next branch instruction.

8. The processor of claim 7, wherein the branch mispredict results from a branch not taken prediction by the way prediction unit and a branch taken prediction by a second branch prediction unit.

9. A mobile device comprising:

a system memory configured to store instructions and data;

a processor coupled to the system memory and configured to execute the instructions, wherein the processor includes:

a cache memory for storing instruction information for one or more instruction fetch groups fetched from a system memory, wherein the cache memory includes a plurality of ways that are each independently controllable;

a way prediction unit coupled to the cache memory, the way prediction unit comprising a next fetch prediction unit, and a sequential way prediction unit, wherein:

the next fetch prediction unit is configured to, in response to a branch taken prediction for a next branch instruction, enable, in a next execution cycle, a given way within which instruction information corresponding to a target of the next branch instruction is stored; and wherein the sequential way prediction unit is configured to, in response to the branch taken prediction for the next branch instruction, enable, one at a time, each corresponding way within which instruction information corresponding to respective sequential instruction fetch groups that follow the next branch instruction are stored;

wherein the sequential way prediction unit is coupled to receive an indication of a previous hit from the next fetch prediction unit, wherein responsive to an indication of a previous hit in the next fetch prediction unit, the sequential way prediction unit is configured to provide a fixed number of way predictions;

wherein the next fetch prediction unit is configured to store, in each of a first plurality of entries, information describing a target of a branch instruction and information identifying a given cache way of a cache memory in which the target is stored and the sequential way prediction unit is configured to store, in each of a second plurality of entries corresponding to a unique one of the first plurality of entries, the given cache way of the cache memory in which each of the next instruction fetch groups is stored.

10. The mobile device of claim 9, wherein the way prediction unit is further configured to disable all remaining ways of the plurality of ways for the next execution cycle in response to the branch taken prediction for the next branch instruction.

11. The mobile device of claim 9, wherein the next fetch prediction unit is configured to store, in each of the first plurality of entries, information corresponding to a target address of a next branch instruction.

12. The mobile device of claim 11, wherein the sequential way prediction unit is configured to store, in each of the second plurality of entries, information identifying the one or more ways of the plurality of ways within which the instruction information corresponding to the respective sequential instruction fetch groups that follow the next branch instruction are stored.

13. The mobile device of claim 9, wherein, during an initialization sequence, the way prediction unit is configured to store the information corresponding to the target address of the next branch instruction and the information identifying the given way of the plurality of ways within which instruction information corresponding to the target of the next branch instruction in response to a detection of a branch mispredict upon a first occurrence of the next branch instruction.

14. The mobile device of claim 9, wherein, during an initialization sequence, the way prediction unit is further configured to store the information identifying the one or more ways of the plurality of ways within which the instruction information corresponding to the respective sequential instruction fetch groups that follow the next branch instruction in response to the way prediction unit storing the information corresponding to the target address of the next branch instruction.

15. A method comprising:
   storing, in a given entry of a first prediction unit, information describing a target of a branch instruction and information identifying a given cache way of a cache memory in which the target is stored, the information being tagged and indexed and tagged by a fetch address; and
   storing, for one or more next instruction fetch groups fetched after the first taken branch instruction, in a respective entry of a second prediction unit that corresponds to the given entry in the first prediction unit, the given cache way of the cache memory in which each of the next instruction fetch groups is stored;
   upon a subsequent fetch of the branch instruction and responsive to a branch taken prediction for the branch instruction, enabling for a next execution cycle, by the first prediction unit, the given cache way of the cache memory that stores the target of the first branch instruction; and
   upon taking the branch instruction, enabling, by the second prediction unit, the given cache way that stores each respective next fetch group after the taken branch;
   wherein the method further comprises the first prediction unit providing, the second prediction unit, an indication of a previous hit in the first prediction unit, and the second prediction unit providing a fixed number of way predictions responsive to receiving the indication.

16. The method of claim 15, further comprising disabling for the next execution cycle, one or more other cache ways of the cache memory.

17. The method of claim 15, further comprising enabling all cache ways in response to a branch not taken prediction.

18. The method of claim 15, further comprising storing during an initialization sequence, the information corresponding to the target address of the next branch instruction and the information identifying the given way of the plurality of ways in response to a detection of a branch mispredict upon a first occurrence of the branch instruction.

19. The method of claim 15, wherein enabling the given cache way of the cache memory that stores the target information includes generating an index based upon a fetch address of the branch instruction, accessing the first prediction unit using the index, and providing an output that includes information corresponding to the given cache way of the cache memory.

20. The method of claim 19, wherein enabling the given cache way of the cache memory that stores each of the next instruction fetch groups includes accessing the second prediction unit using the index, and providing an output that includes information corresponding to the given cache way.

* * * * *